United States Patent [19]
Yalla

[11] Patent Number: 5,592,393
[45] Date of Patent: Jan. 7, 1997

[54] METHOD AND SYSTEM FOR PROVIDING PROTECTIVE RELAY FUNCTIONS

[75] Inventor: Murty V. V. S. Yalla, Seminole, Fla.

[73] Assignee: Beckwith Electric Co., Largo, Fla.

[21] Appl. No.: 404,929

[22] Filed: Mar. 16, 1995

Related U.S. Application Data

[62] Division of Ser. No. 87,083, Jul. 7, 1993, abandoned.

[51] Int. Cl.$^6$ ........................................................ H02H 3/00
[52] U.S. Cl. ........................... 364/492; 364/480; 324/522; 361/20; 361/83
[58] Field of Search ..................................... 364/492, 480, 364/482; 307/153, 99; 361/20, 80, 83, 88, 160, 170, 188, 195; 324/522, 525

[56]  References Cited

U.S. PATENT DOCUMENTS 4,825,323  4/1989  Wilkinson .................................. 361/65
5,367,426  11/1994 Schweitzer, III ......................... 361/80

OTHER PUBLICATIONS

Yalla, "A Digital Multifunction Protective Relay", Transactions on Power Delivery, vol. 7, n. 1, Jan. 1992, pp. 193–201.
Li, "A Study on the Improved Performance of Half–LENS–Half–MHO Relays", IEEE Trans. on Power Apparatus and Systems, vol. PAS–103, No. 12, pp. 3539–3544 Dec. 1984.
Cadick, "Impedance Relays", Plant Engineering, v.38, p. 44 Jan. 1984.

Primary Examiner—Emanuel T. Voeltz
Assistant Examiner—M. Kemper
Attorney, Agent, or Firm—Leo J. Aubel

[57]  ABSTRACT

In a relay protective system a method of providing volts per Hz, loss of field, ground differential, phase distance and over voltage protective relay functions. In addition, the inventive method provides an improved method to selectively block any of the above functions in response to input contacts and selectively activate output contacts in response to operation of the above functions using programmable inputs and outputs.

3 Claims, 12 Drawing Sheets

|  | Direct-Connected | | Delta/Wye-Connected | |
|---|---|---|---|---|
|  | VT Connection | | VT Connection | |
|  | Line-to-Line | Line-to-Ground | Line-to-Line | Line-to-Ground |
| AB Fault | $\dfrac{V_{AB}}{I_A - I_B}$ | $\dfrac{V_A - V_B}{I_A - I_B}$ | $\dfrac{V_{BC} - V_{AB}}{I_B}$ | $\dfrac{V_B - V_0}{I_B}$ |
| BC Fault | $\dfrac{V_{BC}}{I_B - I_C}$ | $\dfrac{V_B - V_C}{I_B - I_C}$ | $\dfrac{V_{CA} - V_{BC}}{I_C}$ | $\dfrac{V_C - V_0}{I_C}$ |
| CA Fault | $\dfrac{V_{CA}}{I_C - I_A}$ | $\dfrac{V_C - V_A}{I_C - I_A}$ | $\dfrac{V_{AB} - V_{CA}}{I_A}$ | $\dfrac{V_A - V_0}{I_A}$ |

NOTE: $V_0$ is the zero sequence voltage.

FIG. 10

|  | INPUTS | | | OUTPUTS | | | | |
|---|---|---|---|---|---|---|---|---|
| RELAY FUNCTION | BLK1 | BLK2 | BLK3 | OUT1 | OUT2 | OUT3 | OUT4 | OUT5 |
| (24) #1 | ○ | ○ | ○ | ● | ○ | ○ | ○ | ● |
| (24) #2 | ○ | ○ | ○ | ○ | ○ | ○ | ○ | ● |
| (24) INV | ○ | ○ | ○ | ● | ○ | ○ | ○ | ● |
| (40) #1 | ● ⌒64 | ● }66 | ○ | ○ | ● }67 | ○ | ○ | ● }68 |
| (40) #2 | ● ⌒65 | ● | ○ | ○ | ● | ○ | ○ | ● |
| (59) #1 | ○ | ○ | ○ | ● | ○ | ○ | ○ | ● |
| (59) #2 | ○ | ○ | ○ | ○ | ○ | ○ | ○ | ● |
| (87GD) #1 | 63 ● | ○ | ○ | ○ | ● | ○ | ○ | ● |
| (87GD) #2 | ● | ○ | ○ | ○ | ● | ○ | ○ | ● |
| (21) | ○ | ● | ○ | ○ | ● | ○ | ○ | ● |
| (32) | ○ | ○ | ○ | ○ | ○ | ● | ○ | ● |

FIG. 11

METHOD AND SYSTEM FOR PROVIDING PROTECTIVE RELAY FUNCTIONS

This application is a divisional application of U.S. patent application Ser. No. 08/087,083, filed Jul. 7, 1993, now abandoned, and priority based on Ser. No. 08/087,083 is desired.

BACKGROUND OF INVENTION

Traditionally, electromechanical or single-function solid-state relays have been designed for use in electric power systems to meet the requirements of synchronous generator protection. Major advances in digital technology and signal-processing algorithms make it now possible to integrate many protective functions into a single digital relay, providing an economically viable alternative for the protection of the generator. In addition, digital technology provides improved performance and greater flexibility.

In earlier prior art digital protective relays, the microprocessor simply replaced discrete relay logic and the voltage and current signals are processed by many analog components. The performance of these prior art protective relays depends on the accuracy of analog components used and is subject to dc offsets which drift with temperature, supply voltage changes, or aging. In later digital protective relays, the microprocessor both processes the signals and performs the logic, thereby eliminating the problems associated with analog hardware and providing a simpler design and better performance.

A prior art multifunction protective relay incorporates many protective functions in a single relay where an analog signal-processing hardware is replaced with a digital signal processor (DSP), as disclosed in U.S. Pat. No. 5,224,011 issued to Murty V. V. S. Yalla, et al. In this patent, the voltage and current input signals of the relay are modeled as sinusoidal signals which may be affected by dc offset and harmonic components. These voltage and current input signals can be characterized by various parameters, namely, rms value, peak value and frequency of the fundamental frequency component. These various parameters of the input signals are estimated using digital signal-processing algorithms.

Relays for protection of synchronous generators connected to electric power systems take into account the types of faults and abnormal operating conditions that may be present at the generator and the connected power system. Many such faults can be detected by sensing the generator terminal voltages and currents.

SUMMARY OF INVENTION

The present invention is directed to providing an improved method for implementing protective relaying functions for five of these faults and abnormal conditions. More specifically the inventive method provides protective relay functions for the following:

1) Volts per Hertz

Whenever the ratio of the voltage to the frequency (volts/ Hz) applied to the terminals of the generator exceeds 1.05 pu (on the generator base), saturation of the magnetic core can occur and stray flux can be induced in components not designed to carry flux.

In this situation, severe overheating can occur, causing damage to the generator. Over excitation most often occurs during start-up, when the generator is operating at reduced frequencies or during complete load rejection. A similar problem can affect transformers.

2) Loss Of Field

Partial or complete loss of field can cause the synchronous generator to operate as an induction generator and draw heavy amounts of reactive power from the power system. This can cause mechanical damage to the generator rotor; also, high currents in the stator can cause stator damage.

Loss of field can also cause the system voltage to sag, causing system instability and possibly cause an electrical system shut down.

3) Phase Distance

The phase distance function provides back-up protection for the synchronous generator, the unit transformer and the connected power system for phase to phase and three phase faults. A simple overcurrent relay may not provide adequate protection since the generator steady state short circuit current can be below the full load rated current of the generator.

The phase distance function, which operates by measuring the impedance to the fault location and hence the distance, performs properly irrespective of the system voltage and fault current magnitudes. The impedance measurement is not affected by any changes in the voltage magnitude.

4) Ground Differential Protection

Generator ground faults may occur due to insulation deterioration of the stator winding. When the generator is grounded through a low impedance, ground fault protection may be provided by the phase differential function depending on the fault level and differential relay sensitivity. Higher sensitivity and fast relay operation for ground faults can be obtained through the use of an additional zero sequence differential (87GD).

5) Overvoltage

Generator overvoltage conditions may occur due to a load rejection or excitation control failure. In case of hydrogenerators, upon load rejection, the generator may speed up and the voltage may reach high levels, causing insulation damage, without necessarily exceeding the generator's V/Hz limit. The overvoltage function 59 is, therefore, generally used in addition to V/Hz protection.

DESCRIPTION OF THE DRAWINGS

FIG. 2 shows standard device-function numbers as defined by the American National Standard Institute (ANSI) C37.2-1987 for the protective relay element functions.

FIG. 10 is a table depicting the impedance calculations for direct-connected and delta/wye-connected generators performed by the inventive method for the phase distance function, FIG. 11 is a table showing the possible combinations of the inventive programmable inputs and outputs.

DESCRIPTION OF THE INVENTION

Figure 1:
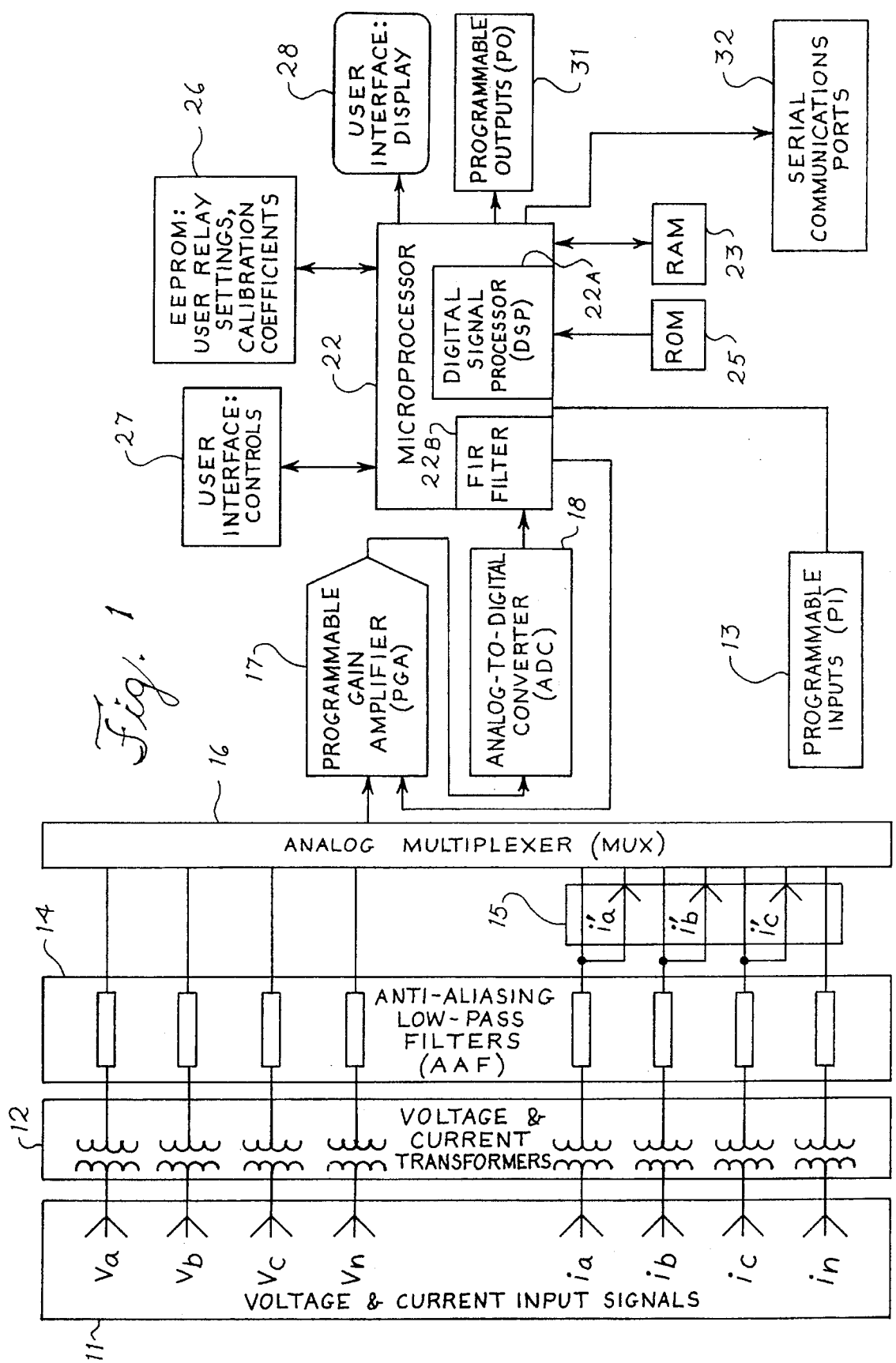
FIG. 1 is a block diagram showing the functions and components required to implement the inventive method.

Refer to FIG. 1, shows a block diagram similar to that disclosed in the above cited Yalla et al U.S. Pat. No. 5,224,011, which discloses functional elements which can utilize the inventive methods described herein. In FIG. 1, eight main inputs are the voltages ($V_a$, $V_b$, $V_c$ and $V_n$) and currents ($I_a$, $I_b$, $I_c$ and $I_n$) of the three phases and neutral at the generator terminals, collectively numbered 11. These inputs are proportionally scaled and isolated by the voltage transformers (VTs) and current transformers (CTs), collectively numbered 12. The Anti-Aliasing Filters (AAFs), collectively labeled 14 filters signal harmonics and noise and prevent improper assimilation or interpretation of high frequency harmonics by the microprocessor 22. The additional current inputs for each of the three phases, collectively labeled 15, provide accurate measurements of low level current signals. As is known, the analog multiplexer 16 sequentially accepts the scaled voltage and current signals and routes them to the programmable gain amplifier (PGA) 17. The gain of the PGA 17 is adjusted for each phase current input by the microprocessor 22 to allow for differences in the impedance reach setting for the phase distance function, described hereinafter. The output of the PGA 17, representing in time sequence the eleven measured parameters, is scaled to make it compatible with the well known analog-to-digital converter (ADC) 18.

The microprocessor 22 contains the digital signal processor (DSP) 22A, which performs the many calculations required in the limited time available. Fundamental to the inventive method is the determination of the rms value and the fundamental frequency of the voltage signal.

The DSP 22A acquires the digitized samples of the voltage and current signals 11 (a total of eleven) from the ADC 18. A digital finite impulse response (FIR) filter 22B is used in the inventive method described hereinafter to filter each of the three-phase voltage signals. The DSP 22A then determines the frequency of the three-phase voltages using the inventive methods described hereinafter. The determined frequency is used to correct the magnitude errors in the AAF 14 and voltage transformers 12 that occur when the frequency is not at or near 60 Hz (off-nominal). The DSP 22A determines the values of the three-phase voltages for the overvoltage and V/Hz functions. The DSP 22A then calibrates the gain errors at nominal frequency of each of the eleven channels using the calibration coefficients (stored in EEPROM 26) that were precomputed using a selected calibration program. The DSP 22A computes voltage and current phasors using a discrete Fourier transform algorithm. The phase angle inaccuracies due to sampling skew, CTs, VTs and anti-aliasing filters are calibrated from the fundamental frequency phasors. The calibrated phasors are then used to compute the impedance for the loss-of-field and phase distance functions. The calibrated phasors are also used for the ground differential function 87GD, described hereinafter. The DSP also implements the mho characteristics for the Loss-of-field and Phase Distance functions, and the inverse-time curves for the V/Hz function, which will be described hereinafter.

The two user interfaces, blocks 27 and 28, are for operator input of settings and for feedback to the operator of the relay status.

When the microprocessor 22 has determined that a particular parameter has exceeded a setting for a preset time delay, and if the particular function is not blocked by one of the programmable inputs 13, to be described hereinafter, a signal is sent to instruct the inventive programmable outputs 31 to take further action, such as opening or closing the appropriate output contact.

The serial communications ports 32 are used to program the settings in the relay or to download information from the relay via an appropriate communications link.

Figure 2:
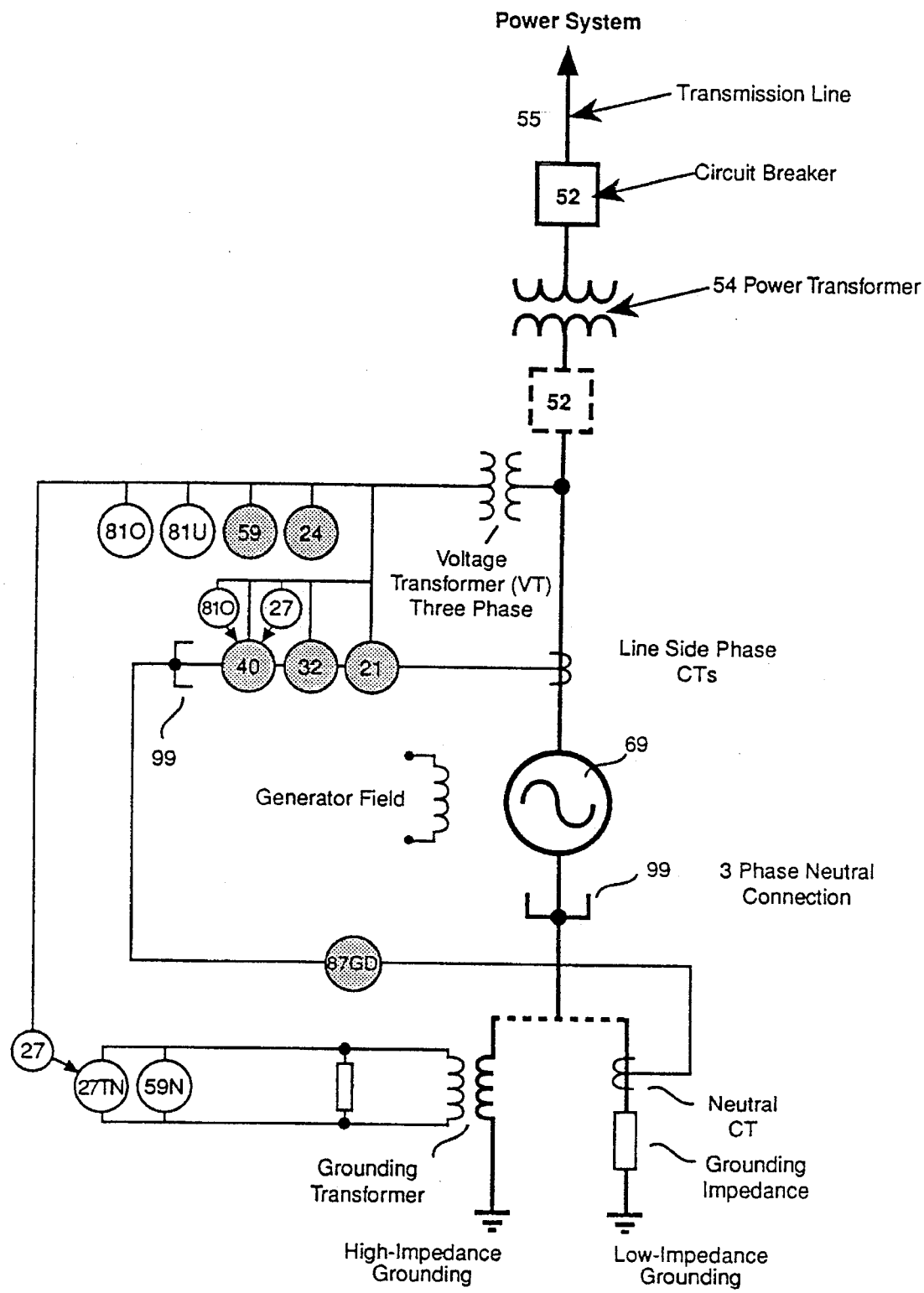
FIG. 2 is a schematic diagram showing a typical application of a protective relay using the inventive method to provide generator protection.

The protective relay functions implemented by the inventive methods for protection of generator 69 are shown in the simplified one-line diagram of FIG. 2. The standard device-function numbers included in FIG. 2 are as defined by the American National Standards Institute (ANSI) C37.2-1987. Note that the protective relaying function that are discussed by the inventive method are shown as shaded circles in FIG. 2. In addition, the functions depicted as white circles are typically required for protection of the system shown in FIG. 2.

The V/Hz function 24 is applied to protect the generator 69 from the overheating that can occur when the ratio of voltage to frequency at the generator terminals exceeds a safe value. The implementation method for the V/Hz function 24 incorporates two definite time setpoints, and four families of inverse-time curves. The user selects one of the curves, to be used alone or in conjunction with a definite time setpoint, to match the specifications of the protected generator. V/Hz protection is especially required during generator start-up and shutdown (i.e., not connected to the system), where the V/Hz measurement may need to be accurate from approximately 2 to 120 Hz. Some applications require that V/Hz protection be applied while the generator is on-line (connected to the associated system). Note that in a preferred embodiment, the range of 8 to 80 Hz was chosen for practical reasons, including keeping down the size and cost of the microprocessor 22. However, the inventive method can easily be extended to 2 to 120 Hz by using a more powerful microprocessor.

The Three-Phase Overvoltage function 59, shown in FIG. 2, is used to protect the generator 69 from overvoltage conditions. Function 59 needs to be accurate over a wide frequency range, especially in the case of hydro generators where operation at high frequencies is possible. Two definite-time setpoints, such as two independent magnitude settings and two time dial settings can be selected to trip the generator or sound an alarm.

Another protective function that is implemented by the inventive method is Loss-of-Field 40, shown in FIG. 2. The field is supplied to a synchronous generator to provide air gap flux. Reduced or complete loss of field can cause loss of synchronism, instability and, possibly, damage to the generator. For these reasons, a loss of field relay is applied to protect the generator and associated system from loss of field. Thus, the generator will be tripped off-line when the relationship between the alternating voltages and currents indicates that a loss-of-field condition has occurred.

The Ground (Zero Sequence) Differential function (shown in FIG. 2 as 87GD) provides ground fault protection for generators grounded through low-impedance by operating on zero sequence current differential. In applications where a zero sequence current source is available, i.e., for grounded power systems, a directional element, can be added to the ground differential function 87GD, which will be described hereinafter.

Function 21 Phase Distance, shown in FIG. 2, can be set by the user to provide backup protection for phase-to-phase and three-phase faults in the generator, power transformer and interconnected system.

Volts Per Hz Function

Refer now to one function implemented by the inventive method: the Volts per Hertz function 24. In the early implementation of the V/Hz function, analog and digital circuits were used to extract the magnitude and frequency on all three phases of the alternating current supply to the relay. Prior art relays with this circuitry operated well but suffered from errors and temperature instability, as well as reliability problems due to the complexity of the circuitry required.

Several prior art systems use a processing method utilizing a discrete Fourier transform (DFT) to obtain both the magnitude and frequency of the alternating current signal. However, the accuracy of the DFT is affected by deviation of the input signal frequency from its nominal value (typically 60 Hz). When the generator is connected to the system (on-line), the local load and large interconnected system will tend to limit frequency deviation from 60 Hz, stabilizing typically between 59 and 61 Hz. A relay implementing the V/Hz function in software using DFT would work well while the unit was on-line, since the deviation is fairly small. However, once the generator is disconnected from the system, the machine may experience frequencies well outside this range. Here the prior art method for calculating V/Hz would give large errors in the estimation of frequency and voltage magnitude.

One prior art method used digital phase-locked loop concepts to automatically change the sampling frequency to an integral and constant multiple of the signal frequency to increase the accuracy of the DFT for frequency signals that are outside a nominal frequency of approximately 59 to 61 Hz. Thus to make the DFT estimates accurate, the sampling rate of the prior art method is changed to be always 16 times the input frequency. For example, if the input frequency is 10 Hz, the sampling rate is 16 times 10 or 160 Hz. At 60 Hz, the sampling rate is 16 times 60 or 960 Hz. With this technique, it is difficult to achieve accuracy over a wide enough frequency range due to implementation limitations, to fully protect the generator. Also when the sampling interval is variable, the integral timers that are needed to obtain the inverse time characteristics are difficult to implement, since the integration period is variable and depends on the input signal frequency. The prior art thus discloses a frequency domain approach which uses DFT.

In contrast to the prior art, the inventive method uses a simple time domain approach to extract the V/Hz information, thereby providing accurate voltage and V/Hz measurements over a wide frequency range such as from 2 Hz to 120 Hz.

Figure 3:
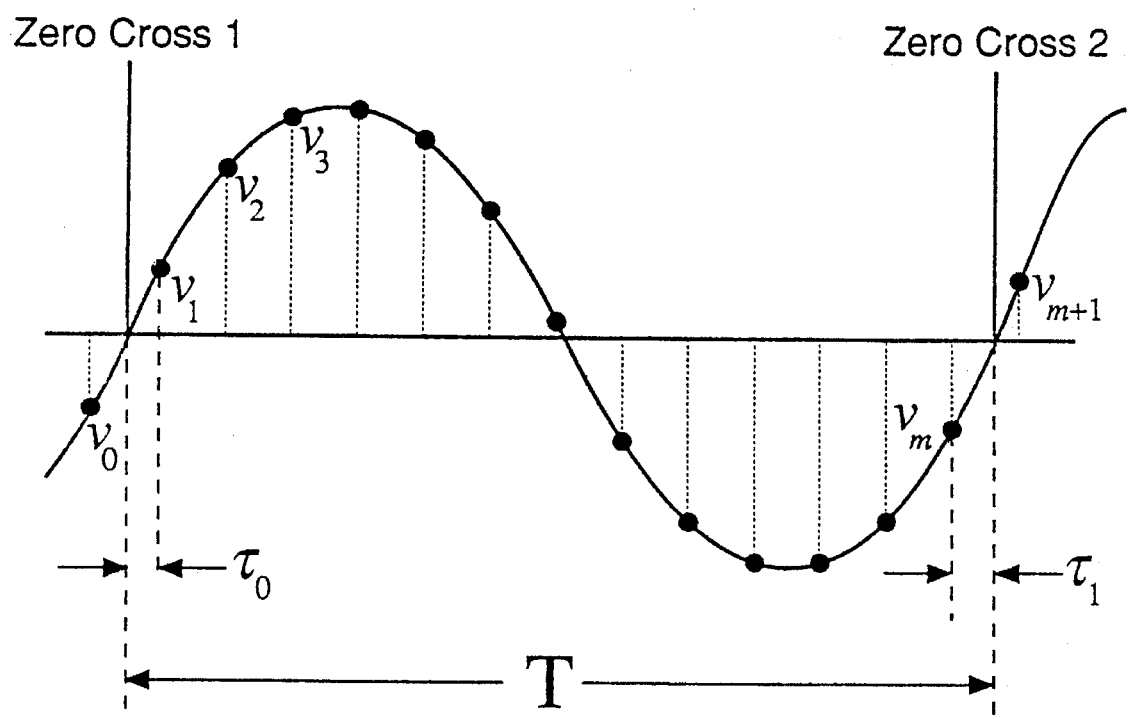
FIG. 3 depicts the sampling technique performed by the inventive method to accurately determine volts per Hertz magnitude.

Referring to FIG. 1, the voltage signals are filtered using 2nd order passive low pass filters to limit the noise and harmonic components. The filtered signals are multiplexed and then sampled at a constant sampling interval ($\Delta T$). The sampled signals are converted to digital numbers using an analog to digital converter. Since the low pass filter is of 2nd order, small components of harmonics and noise may still be present in the sampled signals. These unwanted components should be removed before the samples are used for frequency calculation. In order to filter the remaining noise and harmonic components, a digital finite Impulse Response Filter with a sharp cut off is implemented in the DSP 22A. The filtered samples are represented by $v_k$ where $k=0 \ldots m+1$, as indicated in FIG. 3.

The inventive method measures the time period between the two selected zero crossings and determines the fundamental frequency time period of the voltage signal as follows:

The time period of the fundamental frequency signal = 2 ×

$$\frac{\text{time period between two selected zero crossings}}{(\text{number of zero crossings between the selected zero crossings} - 1)}$$

In FIG. 3, the dots along the sine wave are magnitudes of the voltage samples, represented by $v_0, v_1, v_2, v_3 \ldots v_{m+1}$. The "T," shown in FIG. 3 is the elapsed time from Zero Cross 1 to Zero Cross 2. Since the value of T is no longer a constant and no longer an integral number of samples at frequencies other than 60 Hz, it is obtained through interpolation as follows. Referring still to FIG. 3, the inventive method involves determining the two successive negative-to-positive going transitions of the sine wave, this is represented by the portions of the wave from $v_0$ to $v_1$ and from $v_m$ to $v_{m+1}$.

Since the samples are spaced at a constant interval ($\Delta T$), one can find the period between samples $v_1$, and $v_m$ as:

$$(m-1)\Delta T \tag{2}$$

Where: $\Delta T$ is the sampling interval and m represents the total number of samples between Zero Cross 1 and Zero Cross 2.

The time period from Zero Cross 1 to $v_1$, $\tau_0$ in FIG. 3, and the time period from $v_m$ to Zero Cross 2, $\tau_1$, can be found using linear interpolation as follows:

$$\tau_0 = \left( \frac{v_1}{v_1 - v_0} \right) \Delta T \tag{3}$$

and $$\tau_1 = \left( \frac{v_m}{v_{m+1} - v_m} \right) \Delta T \tag{4}$$

The above equations are good approximations of the sinusoidal voltage waveform near the zero crossings; since, when the sine wave is not distorted and the angle is close to zero, it is well known that:

$$\left. \frac{\sin\theta}{\theta} \right|_{\theta \to 0} = 1 \tag{5}$$

That is, the sine function is linear near the origin or Zero Crossing.

A Finite Impulse Response filter 22B, described hereinafter, is incorporated in the inventive method to filter out noise and distortion so that the calculations using equations (3) and (4) are performed on undistorted sine waves.

Now the time period T, shown in FIG. 3, is given by:

$$T = \tau_0 + \tau_1 + (m-1)\Delta T \quad (6)$$

The total number of Zero Crossings between Zero Crossing 1 and Zero Crossing 2, including Zero Crossing 1 and Zero Crossing 2 is 3.

Time period of the fundamental frequency voltage signal is:

$$\frac{T}{(3-1)} \times 2 = T$$

Now the frequency "f" can be determined as f=1/T.

The technique is based on calculating the rms value of the signal using the following equation.

$$V_{rms} = \sqrt{\frac{1}{T} \sum_{k=1}^{m} V_k^2} \quad (7)$$

Where T and $V_k$ are shown in FIG. 3.
Now the V/Hz is given by $$V/Hz = \frac{V_{rms}}{f} \text{ or} \quad (8)$$
$$= (V_{rms})(T)$$

Figure 4A:
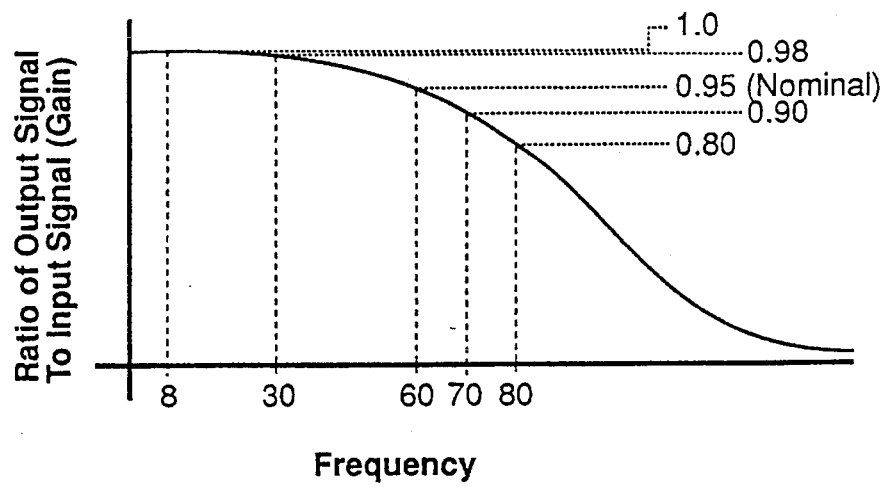
FIG. 4(a) shows the magnitude versus frequency characteristic of the input transformers and anti-aliasing filters on the volts per Hertz calculations.
Figure 4B:
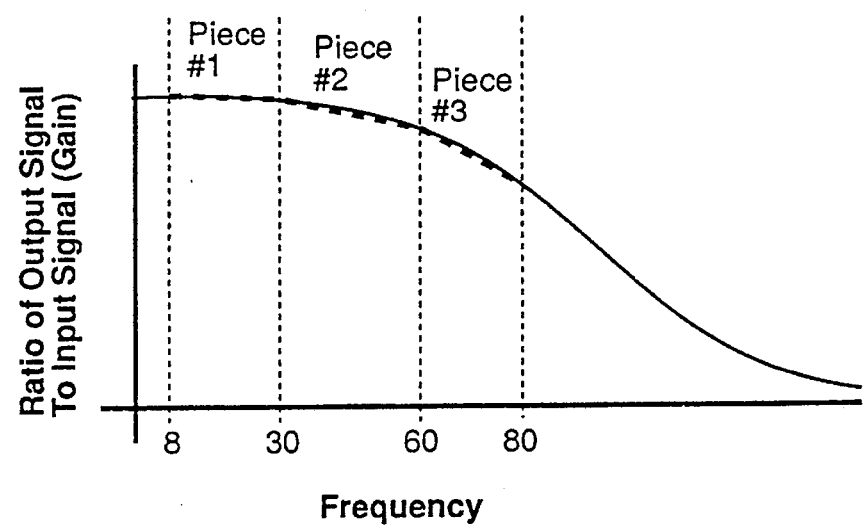
FIG. 4(b) illustrates the inventive method of approximating the magnitude characteristic using a piecewise linear curve.

Refer now to FIG. 4(a), which is useful in explaining the effect of the input transformers 12 and anti-aliasing filters 14, shown in FIG. 1, on the voltage magnitude calculation. The voltage magnitude versus frequency characteristic of the input transformers and anti-aliasing filters used in microprocessor-based relays are usually of low pass type. FIG. 4(a), which is only an illustrative example and not drawn to scale, depicts that the gain of the input circuit is not constant over a frequency range of interest, which can adversely affect the timing characteristics of the V/Hz function 24. The curve shown in FIG. 4(a) shows higher gains below 60 Hz and lower gains above 60 Hz than the nominal gain at 60 Hz. Therefore, in the inventive method described herein, the magnitude characteristic is approximated using a piecewise linear curve, (see, for example, the straight line labeled Piece #1 in FIG. 4(b)). The coefficients corresponding to the straight line segments are used in real time to correct the errors introduced in the input circuit by the input transformers 12 and anti-aliasing filters 14.

Refer now to another feature of the inventive method. Since the V/Hz measurement relies on the zero-crossing detection procedure, described hereinabove, it may be affected by errors due to waveform distortion and noise. As stated earlier, in order to minimize these errors, the voltage signals should be filtered.

In the present invention, the voltage signals are filtered using a digital Finite Impulse Response (FIR) low-pass filter, 22B.

Figure 5A:
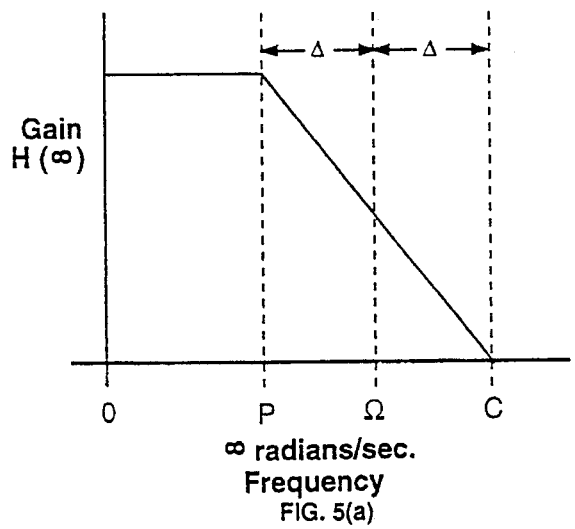
FIG. 5(a) shows the parameters of the Trapezoidal Finite Impulse Response (FIR) filter.

There are various digital filter design techniques available, and a simple trapezoidal approximation is used in the present invention. The characteristics of the FIR filter, 22B are shown in FIG. 5(a) and are defined as:

Sampling period T=1/(60)(16) sec.=1041.667 microseconds

Pass band frequency P=(2π)(100)=628.32 radians/sec. or 100 Hz

Cut-off frequency C=(2π)(200)=1256.64 radians/sec. or 200 Hz $$\Omega = \frac{P+C}{2} = 942.4 \text{ radians/sec.} \quad (9)$$

$$\Delta = \frac{C-P}{2} = 314.16 \text{ radians/sec.}$$

The FIR filter is described by the following equation:

$$y_K = \sum_{n=0}^{N-1} h_n x_{K-n} \quad (10)$$

Where:

$y_K$ is the output sequence

Figure 5B:
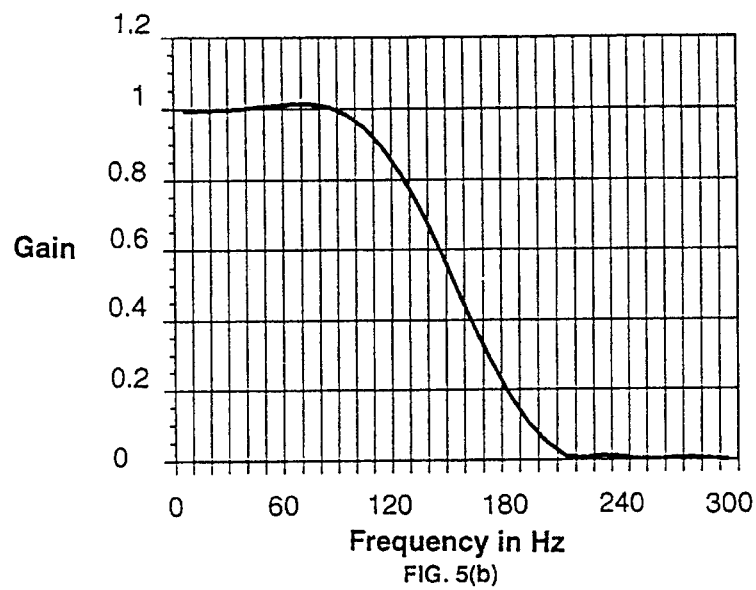
FIG. 5(b) is a graphical representation of the frequency response of the FIR filter.
Figure 5C:
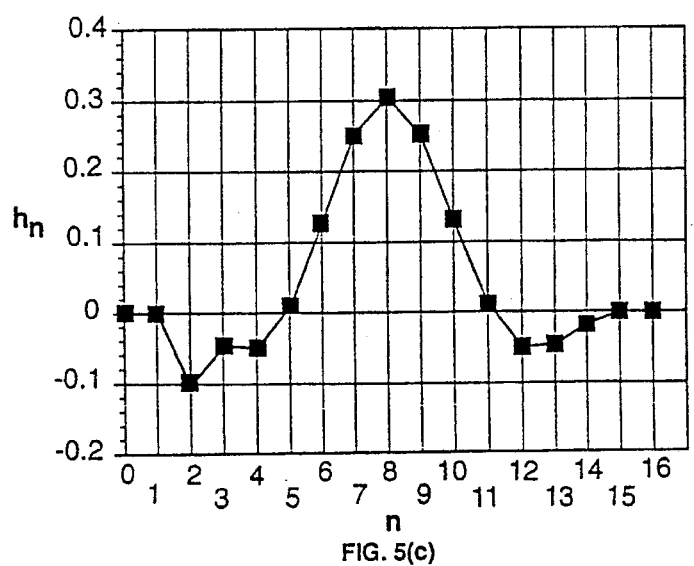
FIG. 5(c) depicts the impulse response of the FIR filter.

N is the filter order $h_n$ are the filter weighting coefficients $X_{K-n}$ is the input sequence A 17th order filter, is chosen in order to obtain a sharp cut-off in the frequency response. The frequency response of the filter is shown in FIG. 5(b). The corresponding impulse response is given in FIG. 5(c). It can be seen from FIG. 5(b) that the filter sharply attenuates harmonics and noise components above 120 Hz. Also the sharp cut-off of the filter is achieved due to the 17th order filter design.

Once the V/Hz measurement is obtained, it is compared with a user selected threshold value. If the V/Hz is above the threshold value, two definite time and four families of inverse time characteristics are implemented by the Microprocessor 22. These curves can be used to match the generator and/or transformer damage curves. Thus the inventive method can be applied to both generator as well as transformer protection applications.

Figure 6A:
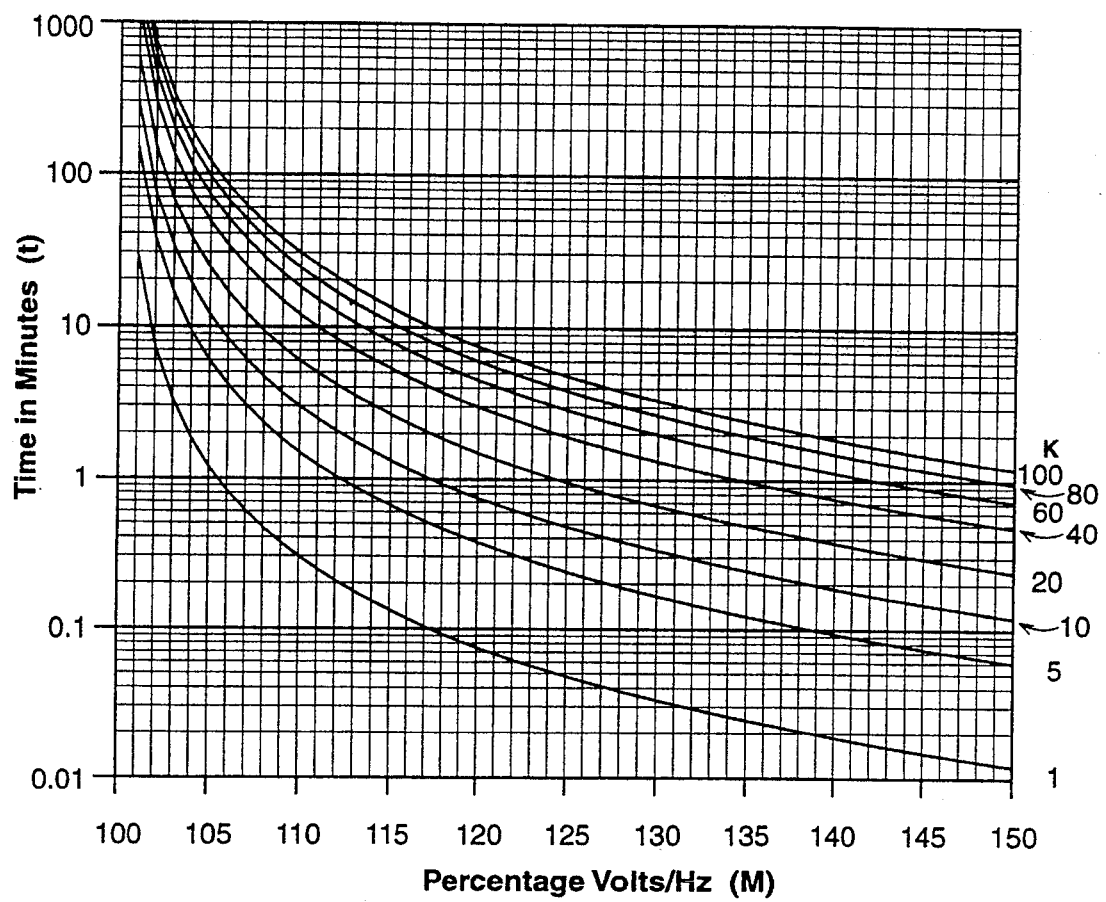
FIGS. 6(a) and 6(b) are the two families of inverse-time curves that are implemented by the inventive method for the V/Hz function.

One of the Curve Family which is used in the industry is shown in FIG. 6(a) and it is obtained by the following equation:

$$t = \frac{0.003K}{\left[\frac{M}{100} - 1\right]^2} \quad (11)$$

Figure 6B:
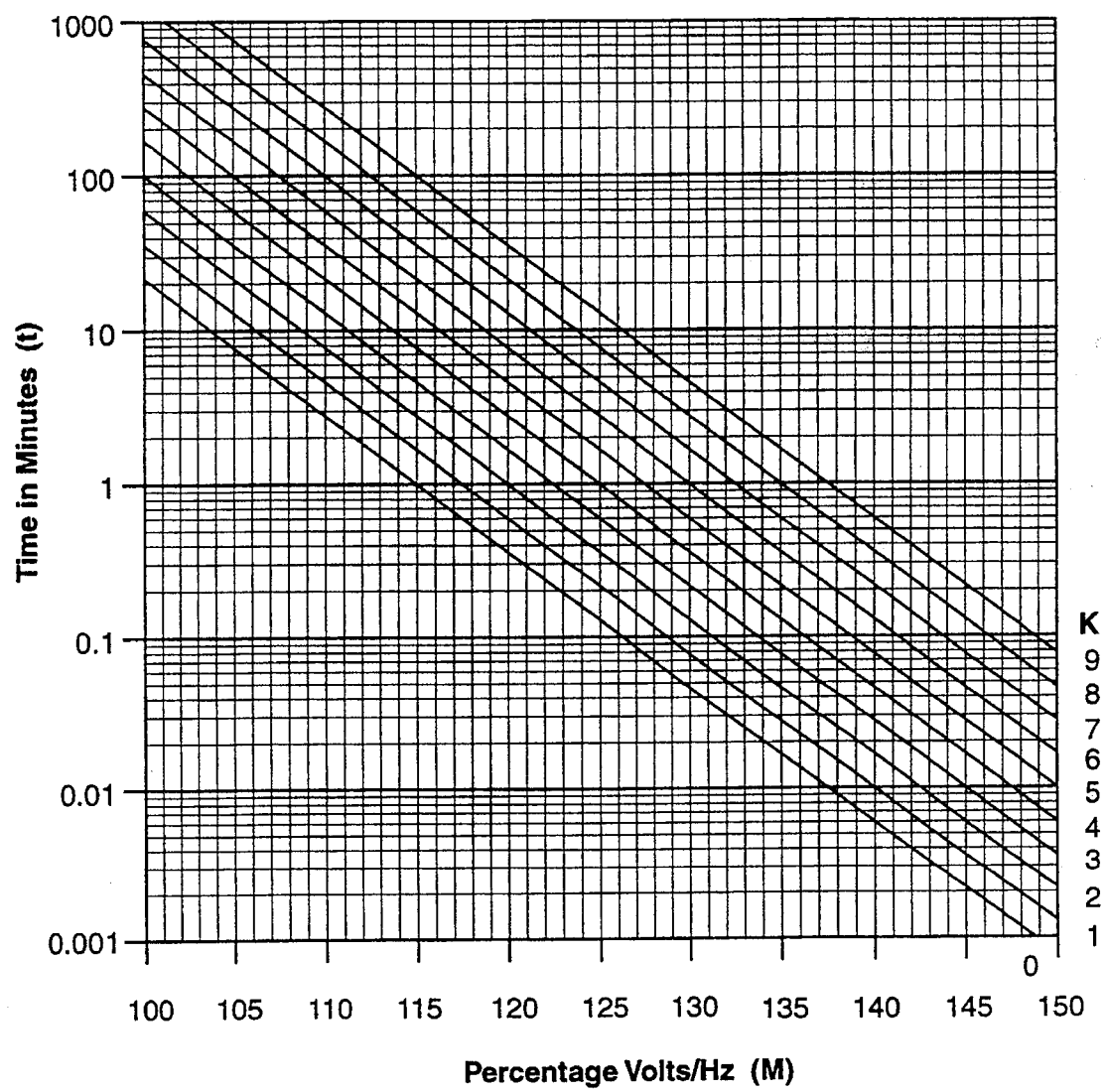

A second Curve Family which is also used in the industry is shown in FIG. 6(b) and it is obtain by the following equation:

$$t = e^{\frac{(115+2.5K)-M}{4.8858}} \quad (12)$$

The other Curve families which are implemented in the present invention are obtained by the following equations:

$$t = e^{\frac{(113.5+2.5K)-M}{3.04}} \quad (13)$$

and $$t = e^{\frac{(108.75+2.5K)-M}{2.4429}} \quad (14)$$

Where:

t is the operating time of the relay in minutes

K is the time dial setting

M is the V/Hz in percent, M is 100% at nominal voltage and nominal frequency

During an overexcitation condition of the generator, the V/Hz measurement may change as time passes, and direct application of equations (11) through (14) could result in erroneous tripping times. To avoid possible timing errors, the inventive method uses the integral of the V/Hz during overexcitation conditions, as follows:

$$\int_{t=t_0}^{t} f(M)dt \geqq C \quad (15)$$

Where: function f(M) and constant C depend upon the type of curve and the time setting selected.

The integration process begins at $t=t_0$, which is the initial time at which the V/Hz exceeds the pickup value with an initial integrated value of $U_0$. The digital implementation of the above equation representing the output of the integrator at Kth instant $U_k$ is as follows:

$$U_K = U_{K-1} + f(M)_K \quad (16)$$

Where: $(M)_K$ is the V/Hz at the Kth instant.

Thus, the protective relay using the inventive method operates when the running sum reaches a threshold value of:

$$C = \frac{C}{T_i} \quad (17)$$

Where: $T_i$ is the integration time period, which is chosen in the present invention as one cycle on 60 Hz basis (16.67 ms).

The integrator has maximum and minimum limits of C' and Zero respectively.

Implementation of equation (16) shown in FIG. 6(a) is straightforward. Implementation of equation (12) shown in FIG. 6(b) and equations (13) and (14) requires computation of exponential function.

In the inventive method described herein, the $e^X$ function is approximated as follows:

$$\begin{aligned} e^X &= 2^{X/\log_e 2} \quad (18) \\ &= 2^{1.4427X} \\ &= 2^{X'} \end{aligned}$$

Where: $X' = 1.4427\ X$

Now $2^{X'}$ can be written as:

$$\begin{aligned} 2^{X'} &= 2^{(X_i + X_f)} \quad (19) \\ &= (2^{X_i})(2^{X_f}) \end{aligned}$$

Where:

$X_i$ is the integer part of $X'$, and $X_f$ is the fractional part of $X'$.

Implementation of $2^{X_i}$ is accomplished with simple shift operations, and $2^{X_f}$ is approximated as follows:

$$2^{X_f} = C_0 + C_1 X_f + C_2 X_f^2 + C_3 X_f^3 + C_4 X_f^4 + C_5 X_f^5 \quad (20)$$

Equation 20 is rewritten to reduce the computational burden from 15 to five multiplications on the microprocessor, as follows:

$$2^{X_f} = (C_0 + X_f(C_1 + X_f(C_2 + X_f(C_3 + X_f(C_4 + X_f C_5))))) \quad (21)$$

The equations 20 and 21 are identified and give same results.

Where:

$C_0 = 1.0$
$C_1 = 0.693147$
$C_2 = 0.2402264$
$C_3 = 0.0555036$
$C_4 = 0.009615978$
$C_5 = 0.001328240$

As an example for Equation (12), shown in FIG. 6(b), the integration would be:

$$U_K = U_{K-1} + e^{\frac{M_K}{4.8858}} = U_{K-1} + (2^{X_i})(2^{X_f}) \quad (22)$$

where $X_i$ is the integer part of $$\frac{M_K}{4.8858} \times 1.4427$$

$X_f$ is the fractional part of $$\frac{M_K}{4.8858} \times 1.4427$$

$$C = e^{\frac{115 + 2.5K}{4.8858}}$$

$$C' = \frac{C}{16.67 \times 10^{-3}}$$

K is the time setting shown in FIG. 6(b).

The inventive method also implements a linear reset characteristic, which closely emulates the generator cooling characteristics. This is achieved by subtracting a constant from the integral $U_k$ when the V/Hz is below the pickup setting. This makes the relay trip the generator faster if the generator has not cooled sufficiently from a previous V/Hz excursion.

Implementation of the V/Hz function by the inventive method in a microprocessor accurately and reliably protects a generator, both on- and off-line, since:

The voltage magnitude and frequency are accurately measured and the V/Hz accurately estimated up to 200% (twice the nominal value) over a wide range of frequency from 8 to 80 Hz. The frequency range can be easily widened by increasing the number of bits selected for the time period representation.

The method implemented works well even at very low voltage magnitudes. The variable gain characteristics of the voltage transformers and anti-aliasing filters over the desired frequency range of interest, which create timing errors, are corrected by the inventive implementation technique. Also, the Digital Finite Impulse Response filter enables the accurate and reliable rejection of harmonics and noise components above 120 Hz.

By selection of definite-time settings and four families of inverse-time curves, as well as the linear reset characteristics implemented by the inventive method, the user can closely duplicate the generator and transformer protection specifications.

Over Voltage

To adequately protect the generator against overvoltage conditions, the overvoltage function 59 should also be accurate over a wide frequency range. Since the time domain approach is used in the inventive method to determine the voltage magnitude as discussed above, function 59 is accurate over a desired range of frequency range of from 8 Hz to 80 Hz. Two voltage magnitudes, each with a separate time delay, are implemented in software by the inventive method.

Loss Of Field

Refer now to another feature incorporated in the inventive method: Loss-of-field protection function 40, also as shown in FIG. 2. Several commercially available prior art impedance relays with an offset mho characteristic have been applied to generators to protect against damage that can be due to loss of the generator field. These relays use phase-to-phase voltages and currents to obtain the impedance for the offset mho characteristics. However, these measurements can still be affected by frequency changes.

Figure 7A:
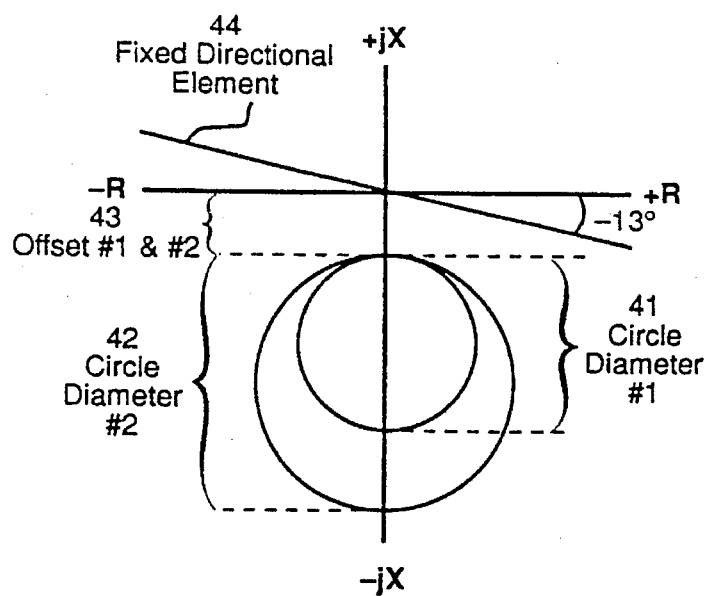
FIG. 7(a) shows an example of the offset mho characteristic that is implemented by the inventive method for the loss-of-field function.
Figure 7B:
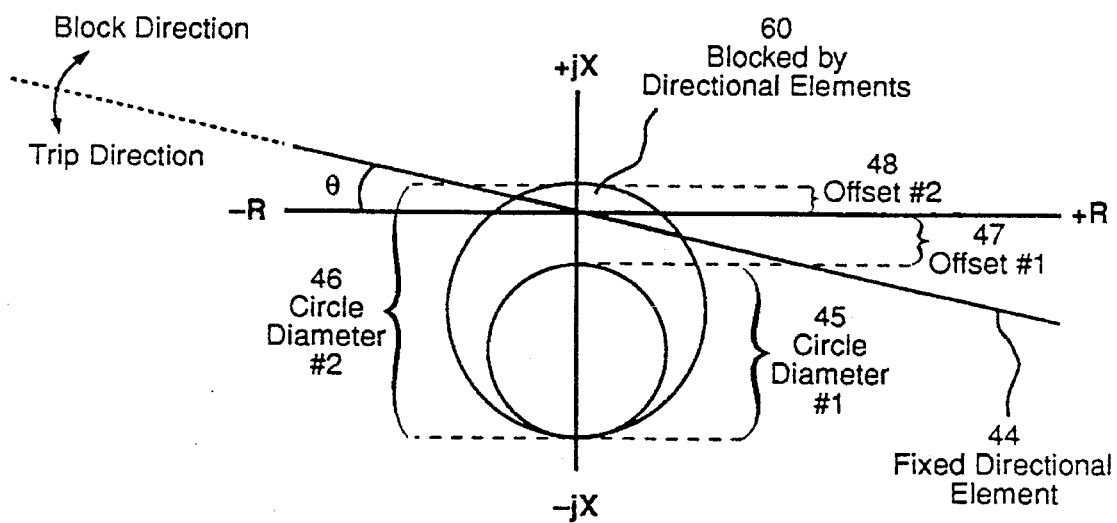
FIG. 7(b) shows the effect of the fixed directional element on the offset mho characteristic that is implemented by the inventive method for the loss-of-field function.

Refer now to FIG. 7(a) and 7(b) where the characteristics of an impedance relay are plotted on a rectangular coordinate system, known as an R–X diagram, with resistance (±R) plotted on the abscissa and reactance (±X) on the ordinate. The "operate to trip" portion of the characteristic usually is described by a circle of impedance values. The traditional characteristic normally used for loss-of-field protection is called an "offset mho" and is implemented by the inventive method described herein. To be compatible with existing industry practice, the inventive method described duplicates two user-selectable "operate to trip" circles (see 41 and 42), each with a selectable time delay, selectable diameters, and selectable degree of offset from the abscissa for each circle (see 43), as shown in FIG. 7(a). An impedance relay with such an offset mho characteristic will only operate to trip the generator off-line, after the appropriate time delay, for impedance values within "Circle Diameter #1" (see 41) or "Circle Diameter #2" (see 42) shown in FIG. 7(a). The degree of offset (see 43) for both circles 41 and 42 has been selected as desired.

Loss-of-field 40 protection works well when the mho characteristics are offset from the origin, as shown in FIG. 7(a), so that tripping of the generator only occurs in the 3rd and 4th quadrants. However, when loss-of-field relays are required to coordinate with generator capability curve and minimum excitation limit curve, the offset mho characteristic needs to be set to include the origin, as shown in FIG. 7(b). However, when the origin is included, the operate to trip characteristic will be in all four quadrants, which opens up the possibility of misoperations during power swings and fault conditions.

Refer to FIG. 7(b), which shows Circle Diameter #1 (45) with one degree of offset (47 Offset #1) and Circle Diameter #2 (46) with a different degree of offset (48 Offset #2). Note also that Circle Diameter #2 now includes the origin. In order to prevent relay misoperations during power swing and fault conditions, a directional element 44, is implemented in the inventive method, which prevents tripping in the 1st quadrant and limited portions of 2nd and 4th quadrants. The microprocessor 22 will only send a signal to the output contacts if the impedance is within the circles and below the directional element.

Assuming voltage and current signals at the terminals of the generator are sampled and brought into the microprocessor through an A/D converter 18, as described previously, the calculations to implement the Loss-of-Field function 40 comprise the following steps:

1. The digitized samples are processed with a prior art discrete Fourier transform (DFT) algorithm to obtain estimates of the fundamental frequency voltage ($V_a$, $V_b$ and $V_c$) and current ($I_a$, $I_b$ and $I_c$) phasors.
2. The positive sequence voltage ($V_1$) and current ($I_1$) phasors are determined.
3. The positive sequence impedance ($Z_1$) is then determined by complex division of the voltage and current phasors.

The positive sequence impedance for the Loss-of-Field function 40 is determined using the following relations for different voltage transformer configurations, as selected by the user for a particular installation.

$$\text{Line-to-Ground } VT\, Z_1 = \frac{V_{1_{L-N}}}{I_1} \quad (23)$$

$$\text{Line-to-Line } VT\, Z_1 = \frac{V_{1_{L-L}}}{(I_1)(1\angle 30°)} \quad (24)$$

Where:

$Z_1$ is the positive sequence impedance $V_{1_{L-N}}$ is the positive sequence line-to-neutral voltage $V_{1_{L-L}}$ is the positive sequence line-to-line voltage $I_1$ is the positive sequence current 4. The positive sequence impedance is compared with the offset mho characteristic selected by the user to determine if the apparent positive sequence impedance is inside the "operate to trip" portion; i.e., within "Circle Diameter #1" or "Circle Diameter #2".
5. If the impedance is found to be inside either circle, the microprocessor 22 sends a signal, after the appropriate time delay selected, that is used to activate an output contact to take further action, such as tripping the generator off-line or controlling the field.

The inventive method also incorporates voltage control and frequency control features. When undervoltage control function 27 is selected, the measured positive sequence voltage magnitude must be less than a user selected setting in order to trip the generator. Similarly, when the frequency control function 810 is selected, the loss-of-field function 40 is prevented from sending a trip signal to the output contacts when the frequency is above a user selected value. The setpoint ranges selected in one embodiment of the installation for voltage control is 5 to 200 V and for frequency control the setpoint range is 60.05 to 67 Hz.

The use of positive sequence impedance in the inventive method; instead of phase-to-phase impedance, as has been accomplished in prior art; has several advantages. First, the use of positive sequence voltage and current phasors provides a filtering effect on the determined impedance during unbalanced conditions of the generator.

Secondly, the effect of frequency variation (50 Hz to 70 Hz on a 60 Hz base) on the offset mho characteristic used for the loss-of-field function 40 is virtually eliminated when positive sequence phasors are used to determine the impedance. The voltage and current phasors, determined on an individual phase, oscillate during off-nominal frequency operation of the generator. These oscillations reflect on the determined impedance giving rise to inaccuracies in the relay operating characteristic. However, when positive sequence phasors are used in the inventive method, the oscillations cancel out, giving a stable and accurate impedance estimate, which is used to implement the loss-of-field function 40.

Ground Differential

Another function implemented in the inventive method: Ground Differential 87GD, also shown in FIG. 2. During ground faults, the differential current $I_d$, which is the difference between the triple zero sequence current $3I_0$, and the neutral current $I_n$, is determined by the microprocessor as follows:

$$I_d = (I_a + I_b + I_c) - I_n$$

$$I_d = 3I_o - I_n \quad (25)$$

Where: $I_a$, $I_b$ and $I_c$ are three phase currents and $I_n$ is the neutral current.

In the above equation the currents $I_d$, $I_a$, $I_b$, $I_c$ and $I_n$ are all phasors determined using a DFT.

Often, the current transformers (CTs) measuring the phase currents may not have the same turns ratio as the neutral CT. This creates differential current during zero sequence unbalance of the system. To solve this problem, prior an methods use an auxiliary CT in the neutral CT circuit to correct for a ratio inequality. In the relay implementing the inventive method, the ratio inequality for a particular installation, which the user inputs to the relay, is digitally corrected in the microprocessor 22 by incorporating a CT ratio correction factor. Thus eliminating a need for an auxiliary CT. The CT ratio correction factor $R_C$, used in the method, is defined as:

$$R_C = \left( \frac{\text{Ratio of Line-Side Phase } CTs}{\text{Ratio of Neutral } CT} \right) \quad (26)$$

For example, if the line-side CTs have a ratio of 3000/5, and the neutral CT has a ratio of 600/5, then:

$$R_C = \left( \frac{3000/5}{600/5} \right) = 5.00 \quad (27)$$

Now the ground differential function 87GD is implemented by determining the difference between the corrected triple zero sequence current, $R_C 3I_0$, and the neutral current, $I_n$:

$$I_d = R_C 3I_0 - I_n \quad (28)$$

The magnitude of $I_d$ is then compared against the user settings, and if $I_d$ is above the setting microprocessor 22 will send a signal calling for further action to be taken, such as generator tripping.

In some cases setting the differential function 87GD becomes a problem due to several reasons, such as when the CT ratios are too far apart or due to saturation of CTs during external fault conditions. In the present invention a directional differential function is provided to overcome the above problems. In this case the relay responds only to faults in the generator winding but not in the system. This scheme requires that a zero sequence source be present in the system. In the inventive method, the directional function of 87GD determines:

$$I_d = -3I_0 I_n \cos \theta \quad (29)$$

Where $\theta$ is the angle between the triple zero sequence current and the neutral current.

Figure 8A:
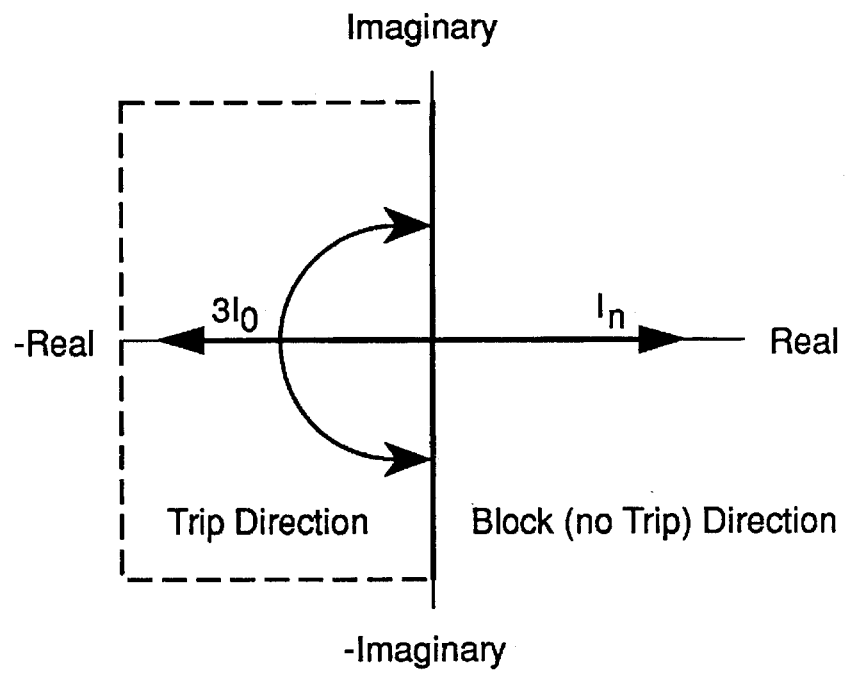
FIGS. 8(a) and 8(b) illustrate two examples of the operating characteristics of the ground differential function implemented by the inventive method.
Figure 8B:
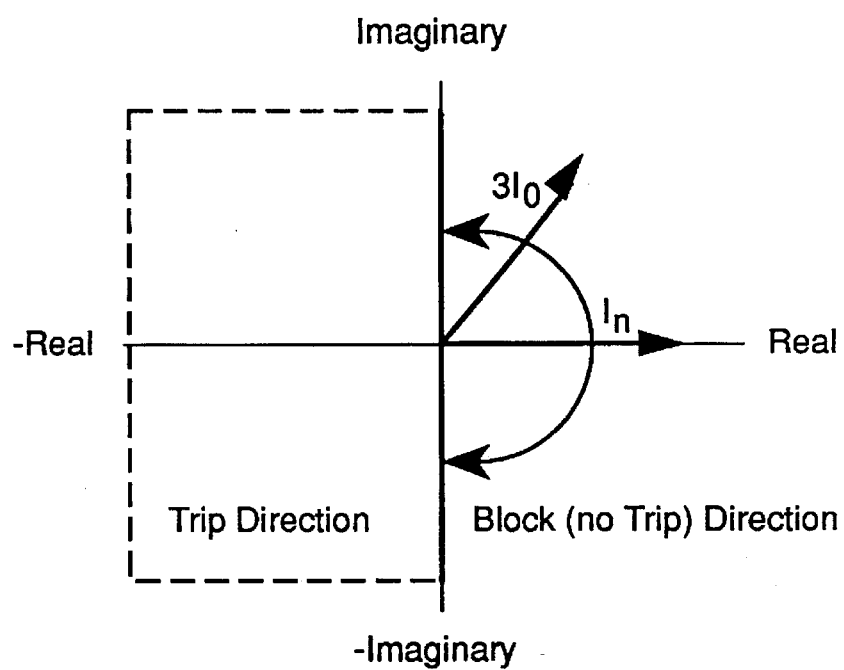

FIG. 8(a) illustrates the directional characteristic for the Ground Differential function 87GD that is incorporated in the inventive method. Taking $I_n$ as the reference, the microprocessor 22 will call for a trip operation if $I_d$ is above the user setting and $3I_0$ and $I_n$ have opposite polarities, i.e., if $3I_o$ is inside the shaded portion of FIG. 8(a), which is the case for faults in the generator. Operation is blocked when $3I_0$ and $I_n$ have the same polarity, i.e., if $3I_o$ is inside the non-shaded portion of FIG. 8(b), which would occur when there is a fault on the external system.

There are two advantages to implementing the directional ground differential function 87GD in this manner. First, implementation of a CT correction factor is not required, and the function works well even with unequal CT ratios, and secondly, during phase-to-phase fault conditions, the possibility of the function misoperating, even with CT saturation, is minimized.

Phase Distance

Figure 9:
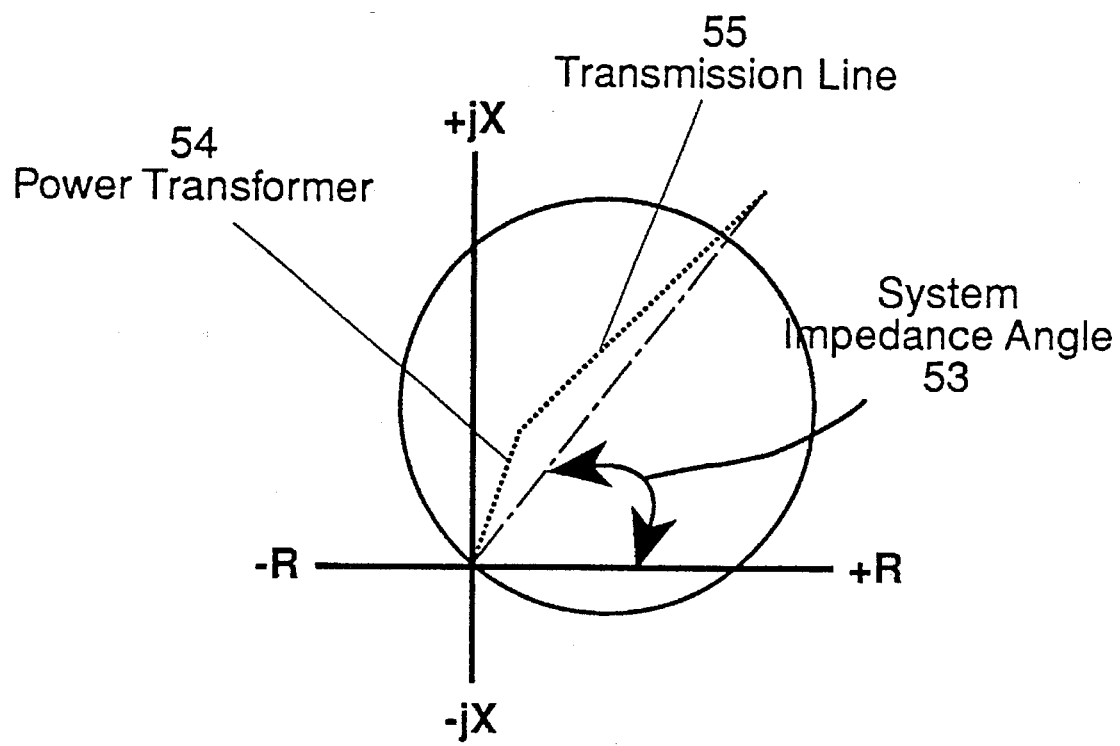
FIG. 9 shows the mho characteristic that is implemented by the inventive method for the phase distance function.

Phase distance function 21, shown in FIG. 2, is also implemented by the inventive method. Refer now to FIG. 9, which shows an example of a mho characteristic on an R–X diagram for the Phase Distance function 21. User settings for a diameter of the circle 51 and system impedance angle 53, as well as a definite time delay, are implemented in the method. In FIG. 9, the user has selected settings that allow function 21 to protect the generator 53, unit transformer 54 and a portion of the connected transmission line 55. The mho circle can also be offset from the origin in either direction. An offset setting of the mho characteristic allows the relay to protect in the forward direction, reverse direction or both directions.

If the transformer 54 is connected in delta/wye configuration and the phase distance function is set by the user to provide backup protection for transmission system faults, then the high-side voltages of the transformer are required to sense the correct impedance. In prior art, the high-side voltages of the transformer are obtained by using auxiliary voltage transformers external to the relay. In the inventive method, the high-side voltages are determined by the microprocessor 22 using the generator terminal voltages, thereby eliminating the need for external auxiliary voltage transformers.

In the inventive method, the following steps are performed for the phase distance function 21.

First, determine the voltage ($V_A$, $V_B$, $V_C$) and current ($I_A$, $I_B$ and $I_C$) phasors using a DFT.

Secondly, determine the apparent impedances as given in the table of FIG. 10. In the table of FIG. 10, select the appropriate column for calculation of the impedance depending upon whether the generator is directly connected to the system or it is connected through a delta/wye transformer.

The above determined impedances are compared by the microprocessor 22 to the mho relay characteristic. If the impedance is found to be inside the "Operate to Trip" shaded circle, the microprocessor 22 sends a signal, after the selected time delay, that is used to activate an output contact to take further action, such as tripping the generator off-line.

Programmable Inputs/Outputs

A programmable inputs/outputs function is implemented in the inventive method as indicated in tabular form in FIG. 11. Protective relays have a number of contact inputs and outputs that are each designated to perform a specific function, e.g., breaker status input, blocking and enable inputs from other devices, and trip, close or alarm outputs.

With the inventive method, any one of the programmable inputs (selected as three inputs in the present embodiment), also shown in FIG. 1 as block 13, can block any one or more of the functions implemented in the relay. These are labeled in FIG. 11 as "BLK1," "BLK2," and "BLK3." In addition, any function included in the relay can be programmed to activate any one or more of the output relays (selected as five outputs as present embodiment and labeled, "OUT1," "OUT2," "OUT3," "OUT4" and "OUT5" in FIG. 11), also shown in FIG. 1 as block 31, when the determined parameters are outside the setting limits. FIG. 11 can be used to determine the possible combinations of input and output logic assignments for the protective functions described hereinbefore. The functions implemented by the microprocessor 22 using the inventive method are shown in the rows across the table. The programmable inputs (BLK1 through BLK3) and outputs (OUT1 through OUT5) are shown in the columns of FIG. 11. The table is set up as if a user has filled in the circles as a record of how the inputs and outputs are assigned. A blackened circle under the input section of FIG. 11 indicates that the corresponding function on the left hand side will be blocked by the presence of contact closure at the block input. A blackened circle under the output section indicates that the corresponding output contact will be activated when an operate condition exists on the corresponding function on the left hand side.

Any of the functions in the left-hand column of FIG. 11 can be programmed to activate any combination of the outputs shown in the five right-hand columns. In a typical protective relay, certain outputs are rated for tripping per ANSI/IEEE C37.90-1989; others are provided primarily to activate alarm-type relays. In the example shown in FIG. 11, "OUT1" through "OUT3" are rated to trip, while "OUT4" and "OUT5" are rated for alarms or annunciators.

The programmable outputs can be used to perform one standard method of tripping a generator called, "sequential tripping." When full load rejection occurs (i.e., tripping the generator off-line under full load conditions), the prime mover can sometimes continue to operate at a fast speed, causing the generator to go into overspeed, possibly damaging the generator. By using the programmable outputs to trip the prime mover first, the load on the generator will prevent overspeed of the generator. Once the prime mover has slowed down enough to cause a reversal of power, reverse power relay, as shown in FIG. 2 as ANSI function 32 and described in U.S. Pat. No. 5,224,011 issued to Murty V. V. S. Yalla et at, can detect the reverse power condition and will trip the generator off-line using a different output of the programmable output contact.

Several advantages are apparent from the ability of the method to program the input and output relays. One is that fewer contacts are required to be mounted externally, increasing the reliability of the protection scheme. Secondly, when associated equipment is changed, a relay using the inventive method can be reprogrammed for the new equipment, increasing versatility.

While the inventive method has been particularly shown and described with reference to a preferred embodiment thereof, it will be understood by those skilled in the art that various changes in form and detail may be made therein without departing from the spirit and scope of the invention.

I claim:

1. A method of providing a loss of field protection of a synchronous generator connected in an alternating current and voltage electrical power system, said method consisting of the steps of, a) charting the characteristics of an impedance relay having a defined positive sequence impedance on a rectangular coordinate graph (having an abscissa, an ordinate, an origin and four quadrants) to obtain two circles which are offset from the origin for identifying the operate to trip portion of said impedance relay, b) positioning said circles to include said origin within a circle to coordinate the impedance values depicted by said circles to the minimum excitation limits and capabilities of the generator;

c) providing a directional trip limiting element extending on said graph from the fourth quadrant, through the origin, through the second quadrant, and through at least one of said circles to effectively prevent tripping of said relay in the first quadrant and limited portions of the second and fourth quadrants;

d) comparing said relay characteristics with the sensed impedance of said generator to determine whether the positive sequence impedance of said generator is within the operate to trip portion of said circles; and e) setting a generator trip time delay to effect tripping when said generator impedance is within said operate to trip portion, whereby mis-operation during frequency excursions, power swings and fault conditions are prevented.

2. A method of providing a loss of field protection of a synchronous generator connected in an alternating current and voltage electrical power system, said method consisting of the steps of, a) developing digitized samples of the alternating current and voltage;

b) estimating the phasors of the fundamental voltage and current;

c) determining the positive sequence voltage and current phasors;

d) dividing the voltage and current phasors to obtain the positive sequence impedance;

e) identifying the operate to trip portion of the characteristics of an impedance relay by plotting said characteristics in a rectangular coordinate graph (having an abscissa, an ordinate, an origin and four quadrants) to obtain two standard type circles of offset mho values;

f) positioning at least one of said circles to include the origin within a circle to coordinate the impedance values depicted by said circles to generator minimum excitation limits and capabilities;

g) comparing the offset mho characteristics with said positive sequence impedance phasors to determine whether said positive sequence impedance is inside the operate to trip portion of said circles; and h) sending a signal after a selected time delay to activate contacts to initiate selective action such as tripping the generator off-line and controlling the field, whereby the effect of frequency variation is minimized by the use of said positive sequence phasors, and whereby the use of positive sequence voltage and current phasors provides a filtering effect on the determined impedance during unbalance conditions of the generator.

3. A method as in claim 2 further including the steps of:

a) measuring the positive sequence voltage magnitude to a selected low voltage setting to trip the generator; and b) tripping said generator when the positive sequence voltage magnitude is less than said low voltage setting, whereby undervoltage protection is provided to the generator.

* * * * *